United States Patent
Vedantam

(10) Patent No.: US 9,619,630 B2
(45) Date of Patent: *Apr. 11, 2017

(54) MOBILE TOKEN DRIVEN SOFTWARE LICENSING

(71) Applicant: Flexera Software LLC, Itasca, IL (US)

(72) Inventor: Sai Vedantam, Saratoga, CA (US)

(73) Assignee: FLEXERA SOFTWARE LLC, Itasca, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/255,074

(22) Filed: Sep. 1, 2016

(65) Prior Publication Data

US 2017/0039354 A1   Feb. 9, 2017

Related U.S. Application Data

(63) Continuation of application No. 14/818,251, filed on Aug. 4, 2015, now Pat. No. 9,454,651.

(51) Int. Cl.
   *H04L 29/06*   (2006.01)
   *G06F 21/10*   (2013.01)
   *G06F 21/31*   (2013.01)
   *H04L 29/08*   (2006.01)

(52) U.S. Cl.
   CPC ........... *G06F 21/105* (2013.01); *G06F 21/31* (2013.01); *H04L 67/18* (2013.01)

(58) Field of Classification Search
   CPC ...... G06F 21/10; G06F 21/105; G06F 21/121; G06F 21/12
   See application file for complete search history.

(56) References Cited

U.S. PATENT DOCUMENTS

| | | | |
|---|---|---|---|
| 2002/0087870 A1* | 7/2002 | Rick | G06F 21/121 713/189 |
| 2006/0031830 A1 | 2/2006 | Chu et al. | |
| 2014/0199962 A1 | 7/2014 | Mohammed et al. | |
| 2015/0058620 A1* | 2/2015 | Buer | G07C 9/00007 713/156 |
| 2015/0310452 A1 | 10/2015 | Baitch et al. | |
| 2015/0381610 A1* | 12/2015 | Poornachandran | H04L 63/0853 713/155 |

* cited by examiner

*Primary Examiner* — Izunna Okeke
(74) *Attorney, Agent, or Firm* — Perkins Coie LLP

(57) ABSTRACT

A token contains licensing information for software stored on another computer. The token connects to the computer wirelessly, and transmits the licensing information, preferably automatically. While the token is connected to the computer, at least one factor in a multi-factor authentication scheme is satisfied for licensed use of the software. When the token disconnects from the computer either at will, or by exceeding the range of the wireless connection, the software on the computer becomes unlicensed and then can no longer execute.

17 Claims, 13 Drawing Sheets

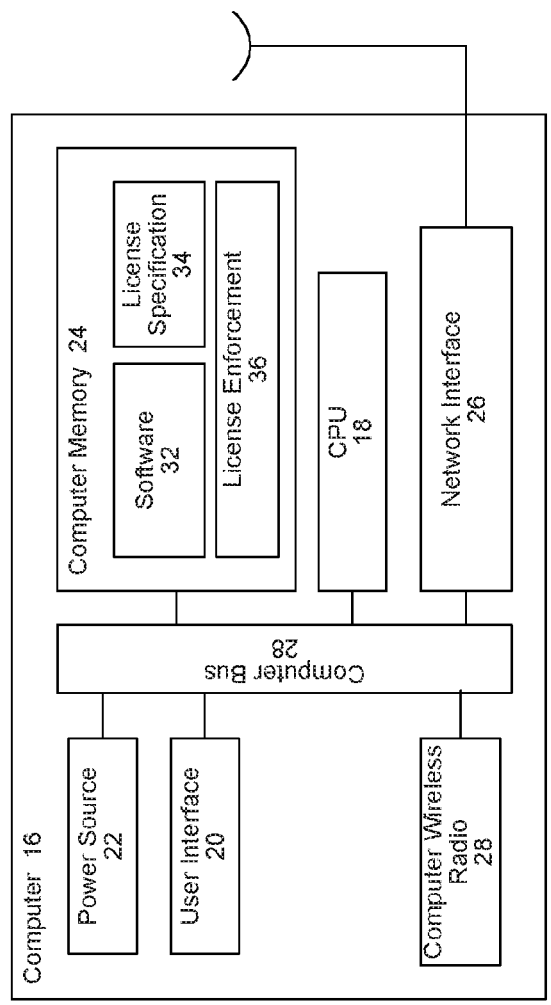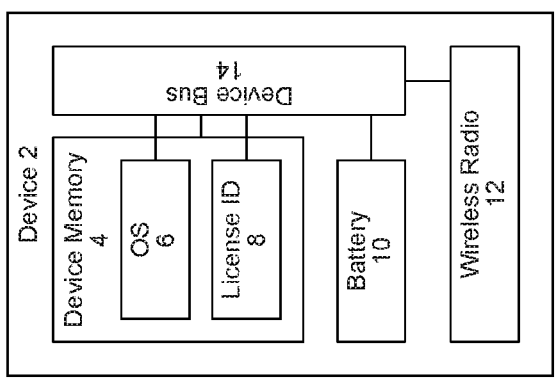
FIG. 1

US 9,619,630 B2

MOBILE TOKEN DRIVEN SOFTWARE LICENSING

CROSS-REFERENCE TO RELATED APPLICATIONS

This application is a continuation of U.S. patent application Ser. No. 14/818,251, filed Aug. 4, 2015, which is incorporated herein in its entirety by this reference thereto.

TECHNICAL FIELD

The invention relates to software licensing, security, and authentication and, in particular, The invention relates to software licensing, security, and authentication and, in particular, apparatus and method for mobile token driven software licensing.

BACKGROUND

There is an ever-increasing demand for security in the current digital age. In particular, companies, such as software licensors, regard the protection of software as an important priority. For example, avoiding exploitation of software on a computer can recover lost profits for the software author. However, licensing schemes, especially those using multi-factor authentication, are often intrusive and burdensome to the user experience. Accordingly, it has been difficult to identify a means to avoid exploitation without putting an undue burden on the user experience.

SUMMARY

Embodiments of the invention include provide a token that comprises a transceiver which establishes a paired session with a device that executes licensed software under predetermined terms and conditions. The licensed software with personal predetermined rights. The token also comprises a license ID stored therein. During the session, the token communicates the license ID to the device to at least partially enable execution of the licensed software in accordance with the predetermined terms and conditions and personal predetermined rights on the device while the token is proximate to the device. Both the paired session and execution of the licensed software are terminated when the token is no longer proximate to the device and the license ID provides for planned obsolescence or self-deletion when the paired session is terminated.

BRIEF DESCRIPTION OF THE DRAWINGS

FIG. 1 is a block diagram of a preferred embodiment of the invention;

DETAILED DESCRIPTION

Terminology

Figure 2:
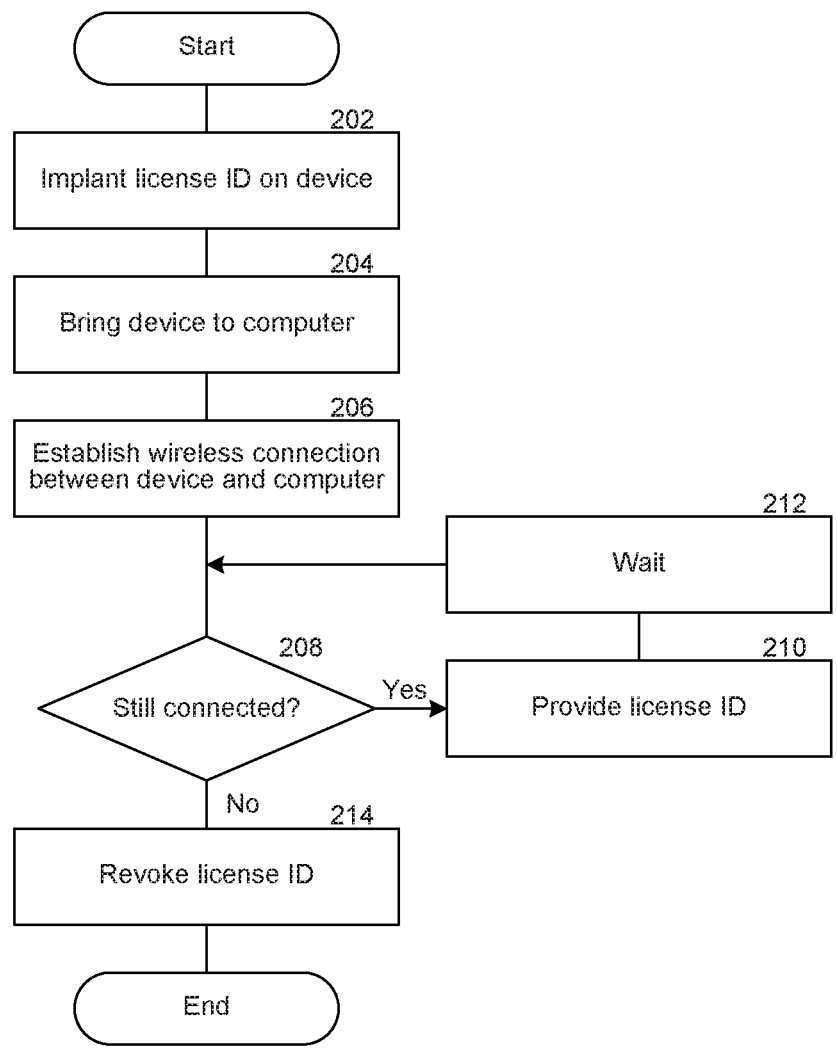
FIG. 2 is a flowchart depicting an embodiment of the method of the invention.

Brief definitions of terms, abbreviations, and phrases used throughout this application are given below.

For purposes of this disclosure the terms "software," "licensable software," and "digital goods" refer to applications, documents, executable code, programs, and records which are subject to licensing agreements.

For the purposes of this disclosure, the term "heartbeat" or "heartbeat check" as relating to software licensing refers to the act of checking on a key element of a license scheme periodically at predetermined intervals.

For purposes of this disclosure, the term "planned obsolescence" as relating to license codes refers to a license code which is only functional for a predetermined period of time. Embodiments of planned obsolescence comprise licensing where a different license code is required at each heartbeat check.

Token Based Licensing of Digital Goods

In embodiments of the invention a user brings a token within a proximity of a computer, and software on that computer is licensed to execute in a determined manner. Similarly, should the user take the token out of the proximity of the computer, the software is no longer licensed and may not execute in the previously enabled manner. Embodiments of this invention are optionally used as a sole enabling factor for software licensure, or as one factor in a multi-factor authentication (MFA) scheme.

FIG. 1 is a block diagram of a presently preferred embodiment of the invention. The invention includes a device 2 which is preferably handheld, mobile or easily portable. In embodiments of the invention, the device 2 is any of a key chain dongle, a cell phone, a PDA, or other suitable personal tokens known in the art.

The device 2 includes a device memory 4 containing operating software 6 and an license ID 8. The operating software 6 comprises of instructions and rules of the operation of the device 2. The license ID 8 is a unique identifier held by the device. The license ID 8 comes in multiple formats and is taught in additional detail below. The device 2 also includes a battery 10 and a wireless radio 12. These components transmit data and power as necessary through a device BUS 14. Those skilled in the art will realize a similar device is not limited to those components shown in FIG. 1

In embodiments of the invention, wireless radio 12 comprises and of a Bluetooth communicator, a near-field communicator, a WiFi communicator, or any other suitable limited range, wireless communication method known in the art. The wireless radio 12 establishes communication with a computer 16.

The computer 16 includes, among other things, a CPU 18, a user interface 20, a power source 22, a computer memory 24, a network interface 26 for connecting to the Internet and a computer wireless radio 28 for connecting to the device 2. The computer wireless radio 28 is not be necessary if the device 2 uses a wireless communication protocol similar to the means the computer 16 uses to communicate with the Internet. In that case, the network interface 26 alone is sufficient. These components transmit data and power as necessary through a computer BUS 30. Those skilled in the art will realize a computer is not limited to those components shown in FIG. 1

The computer memory 24 contains a few elements, those elements including, software 32, a license specification 34 and a license enforcement module 36. The software 32 is a computer program in which an author or user wants to regulate execution or access. The license specification 34 contains licensing information pertaining to the software 32 to be regulated. This information includes the name of the software, the version number, the number of copies (or instances) that has instructions that indicate are licensed, authentication information, and any other suitable metadata pertaining to how the software 32 is regulated. Some embodiments include the names of the parties who are licensed to execute or use the software 32. The license enforcement module 36 implements the logic in the license specification 34. The license enforcement module 36 also optionally verifies the authenticity of the license ID 8 of the device 2.

In some embodiments the software modules of FIG. 1 including the license specification 34 and the license enforcement module 36 exist as a single module or more modules than described. Additionally, In other embodiments, the software modules exists in part on the device 2 rather than the computer 16. Further, in still other embodiments, some of these modules 34, 36 are components of the licensed software 32.

The license ID 8 comes in multiple formats. Embodiments of the license ID 8 are a device ID. Examples of a device ID are any of serial numbers, MAC addresses, or other permanent to semi-permanent unique identifiers. Other embodiments of the license ID 8 are a software license key. Still other embodiments of the license ID 8 are an arbitrary code.

Another embodiment of the invention comprise a license ID 8 which is a morphing token. The morphing token receives periodic instructions to change in some manner. Without periodic instructions the morphing token either becomes outdated or obsolete (for lack of morphing instructions), or self-delete or self-mutilate. The periodic instructions are included on the device 2, in the operating software 6, or come from the Internet.

Figure 3:
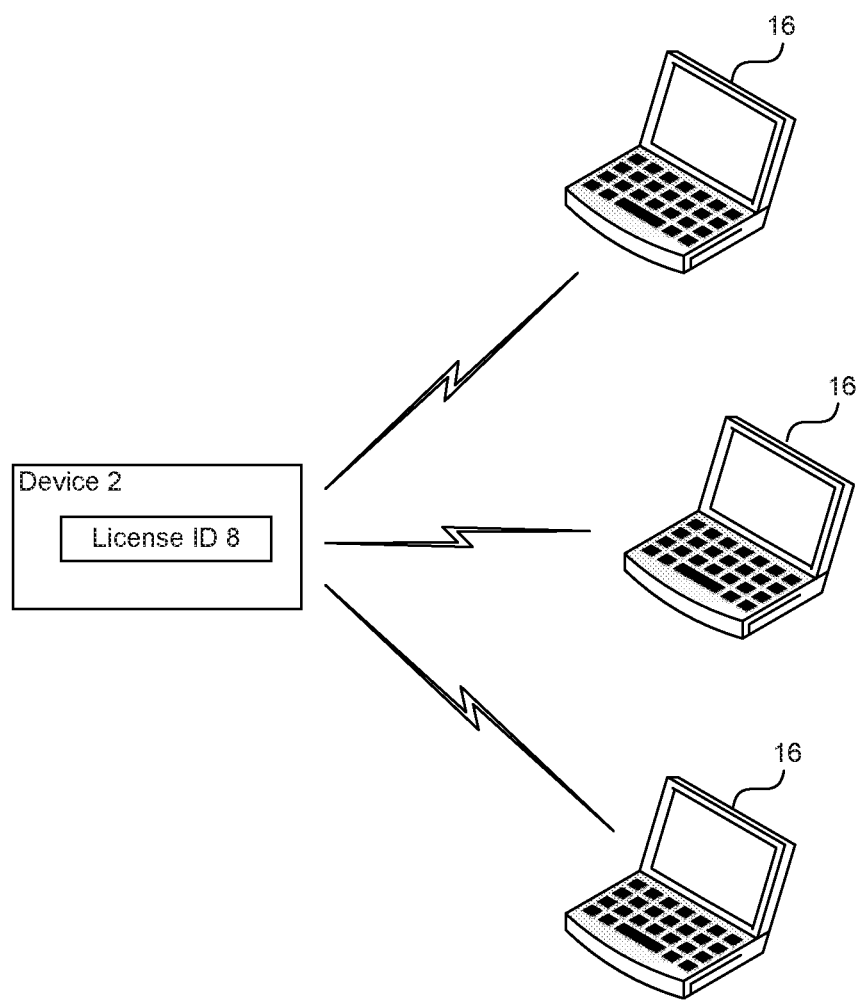
FIG. 3 is an illustration of the method of FIG. 2.

FIG. 2 is a flowchart depicting an embodiment of the method of the invention and FIG. 3 is an illustration of the method of FIG. 2. To begin, the device 2 is implanted with a license ID 8 (202). This is done by programming the device 2 with a code to use as a license ID 8, or the device 2 natively knows the code, and has instructions that indicate the known code is a license ID 8. In some embodiments, the device 2 is unaware of the known code is a license ID 8. Rather, the outside devices such as a computer 16 interpret the meaning of the known code.

The device 2 is next placed in proximity to a computer 16 including licensable software (204). The device 2 establishes a connection with the computer 16 (206). In some embodiments, multiple computers connect to the device 2 simultaneously. As an example, Bluetooth range is generally 10 meters, so as many computers 16 as fit within 10 meters connect to the device 2. Different wireless radios have varying ranges. If the wireless protocol is WiFi, there is 20-30 meters of range in which computers 16 connect to the device 2.

Once connected (208), the device 2 provides the license ID 8 to the connected computer 16 (210). Optionally, the computer 16 first requests the license ID 8 from the device 2 before the device 2 provides the license ID 8 to the computer 16. The computer 16, and software modules thereon, then use the license ID 8 as directed by other elements of the invention. After a given time elapses (212), the system again checks if the device 2 is still connected to the computer 16 (208). This check occurs using a heartbeat monitoring feature. If the connection persists, the license ID 8 remains with the computer 16 (210). If the connection has ended, the license ID 8 is revoked (214).

Revocation of the license ID 8 occurs in a variety of ways. In an embodiment the license ID 8 is revoked by the computer 16, or one of the software modules thereon, using instructions to delete the license ID 8 should the connection to the device 2 break. Another method to revoke the license ID 8 is to have the license ID 8 self-delete if the license ID 8 does not receive outside input instructing preservation. A third method of revoking the license ID 8 is for the license ID 8 to consistently change to function, and to cease changing when the connection between the device 2 and the computer 16 is broken.

As mentioned above, this method works while the device 2 is connected to a plurality of computers 16. In some embodiments, there are no additional verification steps before licensure of digital goods occurs. As an illustrative example, a teacher who carried a device 2 walks into a classroom where the device establishes connections with all of the student's computers 16, and the software on the student's computer's 16 is licensed to operate. Once the teacher, and by extension the device 2, left the classroom, the student's computers 16 no longer execute the software.

In another illustrative example, a system administrator who carries the device 2 roams a business freely, and when the administrator with the device 2 came within range of a computer 16 or group of computers 16, additional software features activate on those computers 16. When the administrator went to a different section of the business the software features deactivate.

Alternatively, in other embodiments, it is preferred for the device 2 to act as a single factor in a MFA scheme. In an illustrative example, a user walks into an Internet café carrying a device 2. All the computers 16 in the internet café become primed, but no software is licensed until the user enters in additional input such as any other suitable MFA factor known in the art, or disclosed herein. The software then remains licensed and operational until the user leaves the café and the device 2 leaves proximity with the computers 16 in the café.

Figure 4:
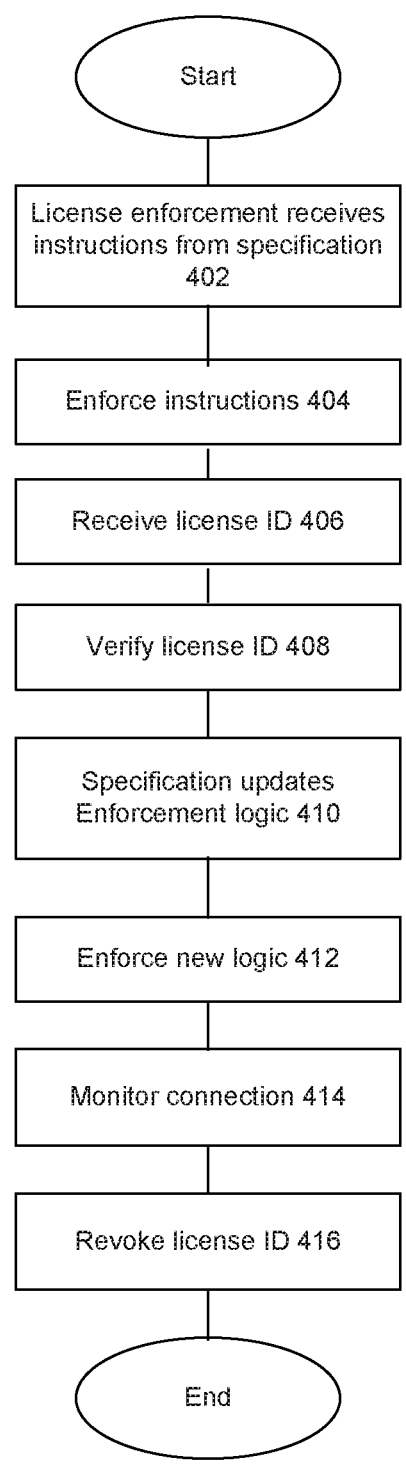
FIG. 4 is a flowchart illustrating license enforcement.

FIG. 4 is a flowchart illustrating license enforcement. On the computer 16 storing licensable software 32 there are license enforcement 36 and license specification 34 modules. In operation, the license specification 34 provides logic for the license enforcement module 36 (402) which the license enforcement module 36 enforces upon users of the software (404). Subsequently a user brings a device 2 to pair with the computer 16 and the license ID 8 is sent to the computer 16. The modules 34, 36 receive the license ID 8 (406).

The license enforcement module 36 then verifies the authenticity of the license ID 8 (408). Given a valid license ID 8, the license specification 34 provides new logic to the license enforcement module 36 (410). The license enforcement module 36 then enforces the new logic on the software 32 (412). The license enforcement module additionally monitors the connection between the device 2 and the computer 16 as disclosed above (414). Should the connection between the device 2 and the computer 16 break, the license enforcement module 36 deletes the license ID 8 and enforce the original logic (416).

Figure 5:
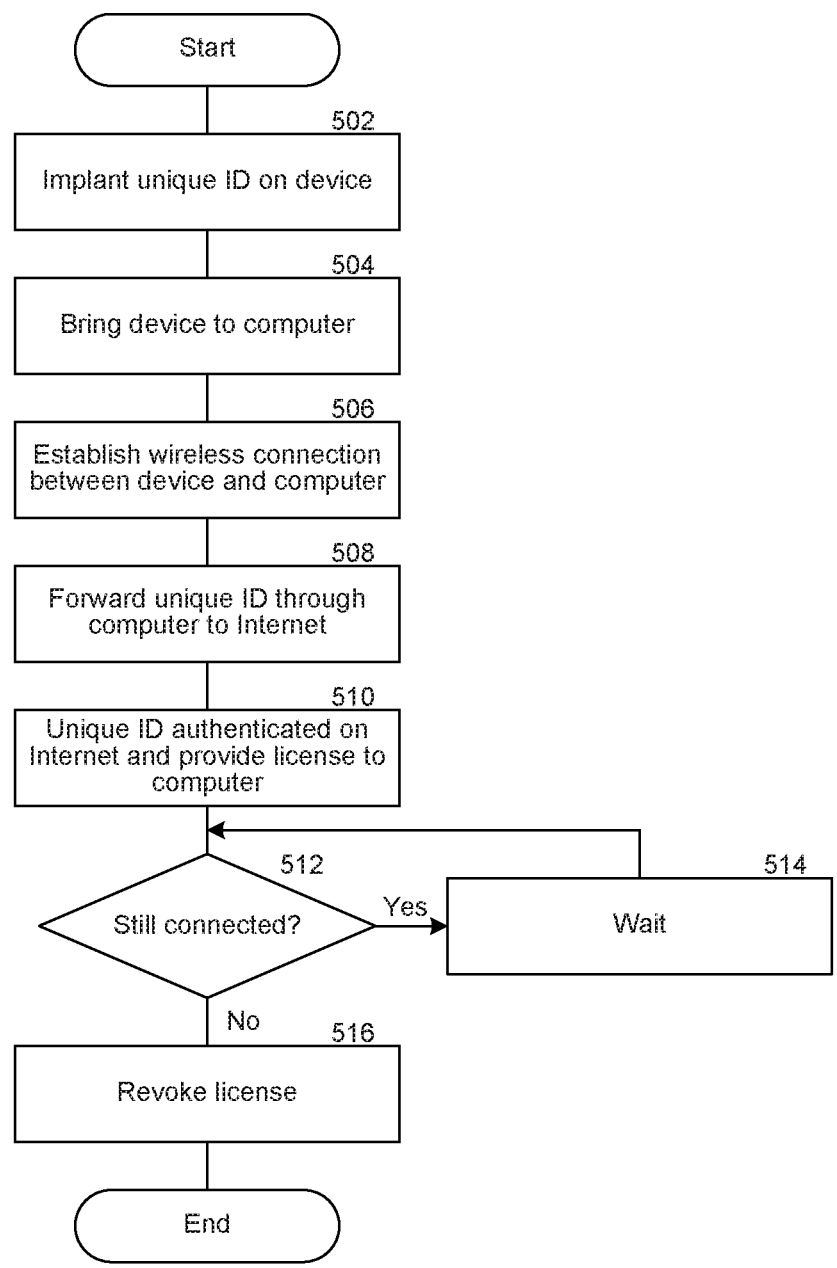
FIG. 5 is a flowchart depicting an embodiment of the invention using a distributed system.
Figure 6:
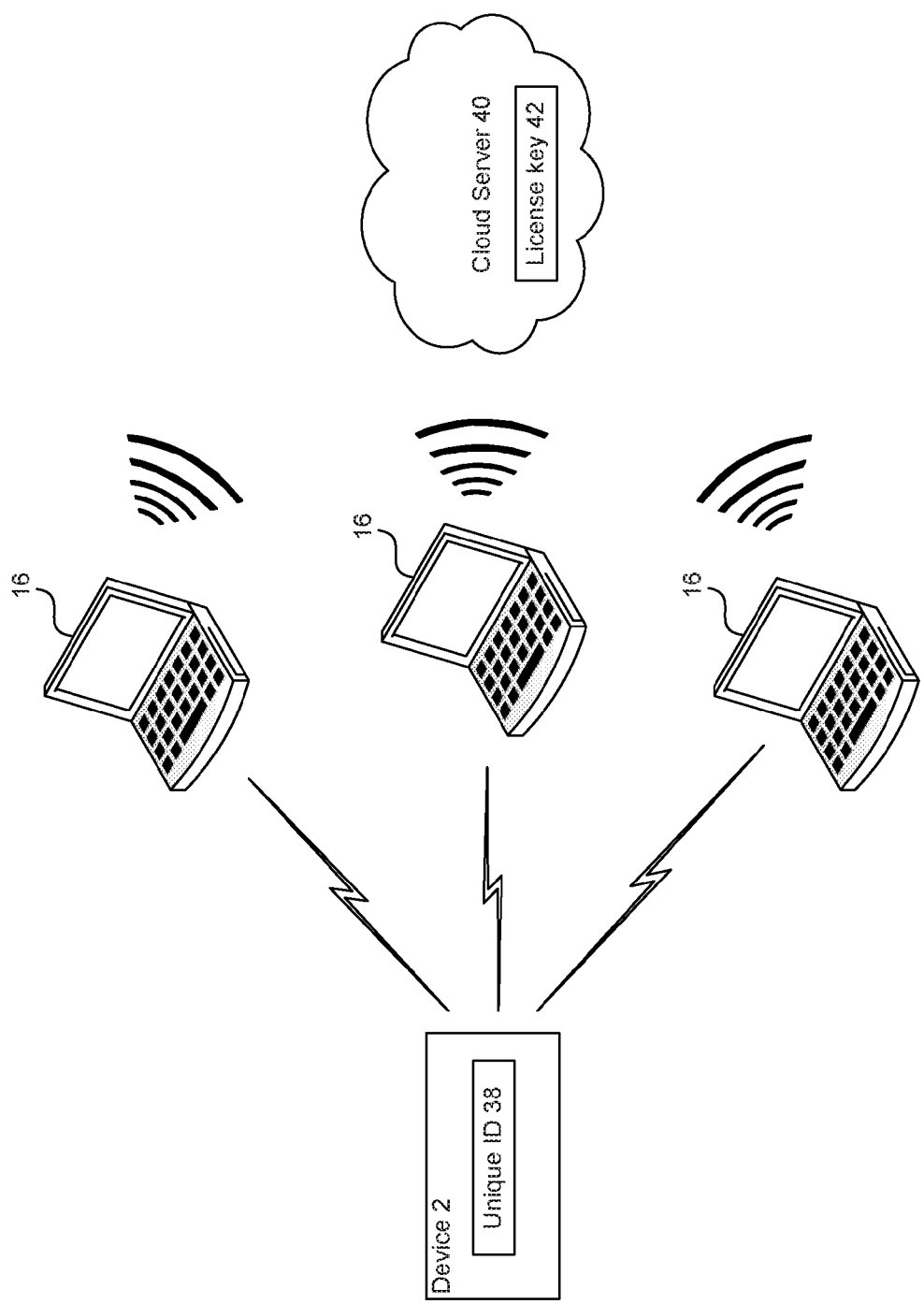
FIG. 6 is an illustration of the method of FIG. 5.

FIG. 5 is a flowchart depicting an embodiment of the invention using a distributed system, and FIG. 6 is an illustration of the method of FIG. 5. To begin, the device 2 is implanted with a unique ID 38 (502). This is done by programming the device 2 with a code to use as a unique ID 38, or the device 2 natively knows the code, and has instructions that indicate the known code is a unique ID 38. In some embodiments, the device 2 is unaware of the known code is a license ID 38. Rather, the outside devices such as a computer 16 interpret the meaning of the known code.

The device 2 is next placed in proximity to a computer 16 including licensable software (504). The device 2 establishes a connection with the computer 16 (506). In some embodiments, multiple computers connect to the device 2 simultaneously. As an example, Bluetooth range is generally 10 meters, so as many computers 16 as fit within 10 meters connect to the device 2. Different wireless radios have varying ranges. If the wireless protocol is WiFi, there is 20-30 meters of range in which computers 16 connect to the device 2. If the wireless protocol is near-field communication (NFC), there is less than a foot of range in which computers 16 connect to the device 2. Other examples include cellular protocol.

Once connected, the device 2 provides the unique ID 38 to the connected computer 16, which in turn provides the unique ID 38 to a cloud server 40 (508). Optionally, the computer 16 first requests the unique ID 38 from the device 2 before the device 2 provides the unique 38 ID 8 to the computer 16. The cloud server 40 then authenticates the unique ID 38 as the unique ID 38 pertains to software licensure and provides the computer with a license key 42 (510). The license key 42 enables the licensed software on the computer to perform according to a predetermined licensing scheme. After a given time elapses (514), the system checks again if the device 2 is still connected to the computer 16 (512). This check occurs using a heartbeat type monitoring feature. If the connection persists, the license key 42 remains with the computer 16 until the next check (512). If the connection has ended, the license key 42 is revoked (516).

Revocation of the license key 42 may occur in a variety of ways. In an embodiment the license ID 8 is revoked by the computer 16, or one of the software modules thereon, having instructions to delete the license key 42 should the connection to the device 2 break. Alternatively, the cloud server 40 issues instructions to the computer 16 to delete the license key 42. Another embodiment uses a morphing license key, having properties similar to the morphing token discussed above.

As mentioned above, this method works while the device 2 is connected to a plurality of computers 16. While connected to a cloud server 40, there are additional controls to the distribution of license keys 42. In an embodiment of the invention, the cloud server 40 only distributes a fixed number of keys at a time, or depends on another variable or factor before issuing a license key 42. Use of a distributed system with a cloud server 42 gives additional controls against exploitation because software activation or licensure is not dependent on the device 2 alone Despite the additional controls there is no additional interruption to the user of the digital good.

In an illustrative example, a new student walks into a university library carrying the device 2 which has the new student's student ID encoded therein. When the new student approaches a bank of computers 16, the device 2 connects to the computers 16 and transmits the student's ID to each of the computers 16. The student selects a computer 16 and attempts to use licensed software, the software, then unlicensed, contacts the cloud server 40 with the new student's unique ID 38, as well as the unique ID's 38 of other old students in the vicinity. The cloud server 40 knows that license keys 42 have been issued to all previous unique ID's 38 and the only new ID is that of the new student, so the cloud server 40 issues a license key 42 to the computer 16 that the new student has chosen. The software is then licensed to operate according to given parameters. When the student leaves the library, the cloud server 40 revokes the license key 42, or cause the license key 42 to be inoperable.

This illustration creates conditions for cases of harassment or exploitation where a malicious actor acquires the license key 42 associated with the new student before the new student was able. In such cases additional factors in a MFA scheme, such as a log on password, biometric authentication, or other challenge/response systems are inserted to prevent harassment.

In other illustrations the cloud server provides other types of regulation depending on numerous factors combined with the device's unique ID 38 including identification of the computer 16 paired with the device 2, the location of the computer 16, the Internet network the computer 16 was on, or any other suitable MFA factor known in the art. The differing types of regulation include issuing license keys 42 with differing permissions, or license keys 42 that enable differing digital goods.

Figure 7:
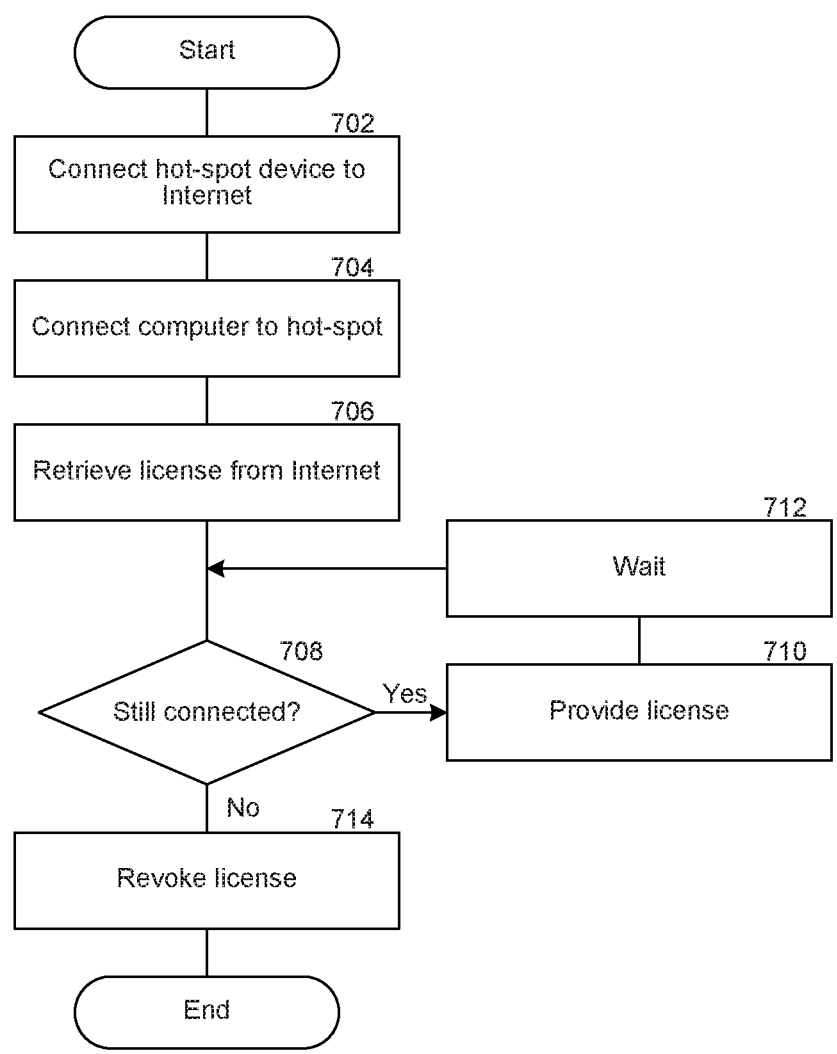
FIG. 7 is a flowchart depicting an embodiment of the invention using a hot-spot device system.
Figure 8:
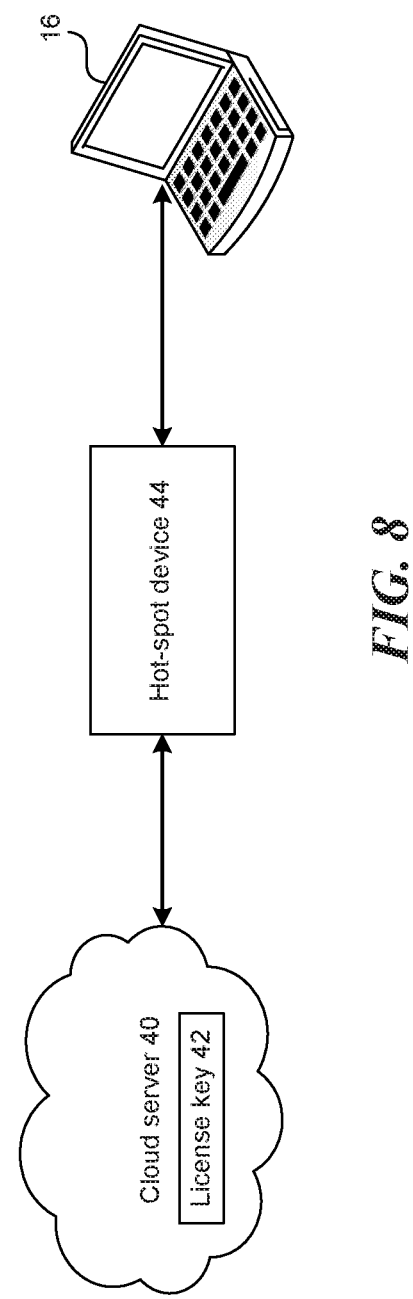
FIG. 8 is an illustration of the method of FIG. 7.

FIG. 7 is a flowchart depicting an embodiment of the invention using a hot-spot device system, and FIG. 8 is an illustration of the method of FIG. 7. An alternate embodiment of the device 2, is a hot-spot device 44. A hot-spot device 44 is a similar personal token type item, which broadcasts an Internet signal. A common example of such a hot-spot device 44 is a smart phone which is enabled to rebroadcast the cell service signal received from the service provider, as a WiFi signal. Other types of hot-spot devices 44 are suitable so long as such hot-spot devices 44 are wireless personal tokens, capable of providing Internet connectivity to connected devices.

To begin, the hot-spot device 44 is placed in proximity to a computer 16 including licensable software (702). The computer 16 then establishes a connection with the hot-spot device 44, and subsequently the Internet (704). In an embodiment of the invention, multiple computers simultaneously connect to the hot-spot device 44. The computers 16 connect to the hot-spot device 44 as either an unsecured signal, or with a password. The hot-spot device 44 then retrieves a license key 42 from a cloud server 40 (706). The cloud server 40 is enabled to provide similar regulation to the licensed key distribution as disclosed above.

Once connected (708), the device 2 provides the license key 42 to the connected computer 16 (710). Optionally, the computer 16 first requests the license key 42 from the device 2 before the device 2 provides the license key 42 to the computer 16. The computer 16, and software modules thereon, then use the license ID 8 as directed by other elements of the invention. After a given time elapses (712), the system checks again if the device 2 is still connected to the computer 16 (708). This check occurs using a heartbeat type monitoring feature. If the connection persists, the license key 42 remains with the computer 16 (710). If the connection has ended, the license key 42 is revoked (714).

Variations on the license ID 8 include implementations of executable code. Such executable code is used to provide additional features to software 32 running on a computer 16, or even complete software modules. In use, a user comes within proximity to a computer 16 and licensed software or software features is enabled on the computer 16. When the user leaves, the software or the features are deleted. The software or features are transmitted over the wireless connection between the device 2 and the computer 16. The transmission of software or features is by streaming or uploading/downloading. The revocation of the transmitted software or software features is performed as revocation of license materials is described above.

Location-Based Licensing of Digital Goods

In embodiments of this invention, a user brings a device intended to operate certain software to a specific place or region, and software on that device is licensed to execute in a determined manner. Similarly, should the user take the device out of the place or region, the software is no longer licensed and does not execute in the previously enabled manner. Embodiments of this invention are used as a sole enabling factor for software licensure, or as one factor in a multi-factor authentication (MFA) scheme.

Figure 9:
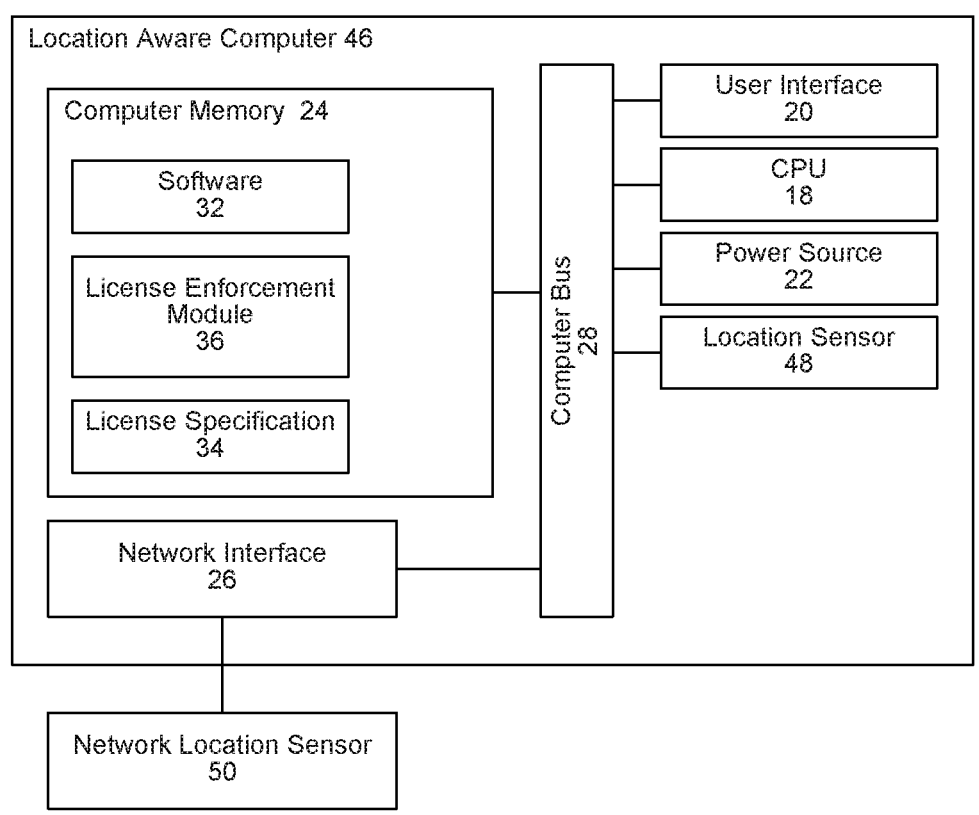
FIG. 9 is a block diagram of a computer including a location sensor.

FIG. 9 is a block diagram of a computer including a location sensor. The location aware computer 46 of FIG. 9 has similar components to the counterpart computer 16 in FIG. 1, with the addition of a location sensor 48 and a network location sensor 50. The location sensor 48 refers to a GPS module, a network triangulation device, a GPS with smart map integration, an altimeter, or any other suitable location aware device known in the art. A network location sensor 50 refers to methods known in the art to identify the location of a computer based on the computer's connection to the Internet. Such methods include IP tracing, network recognition, and geo-fence contact.

Figure 10:
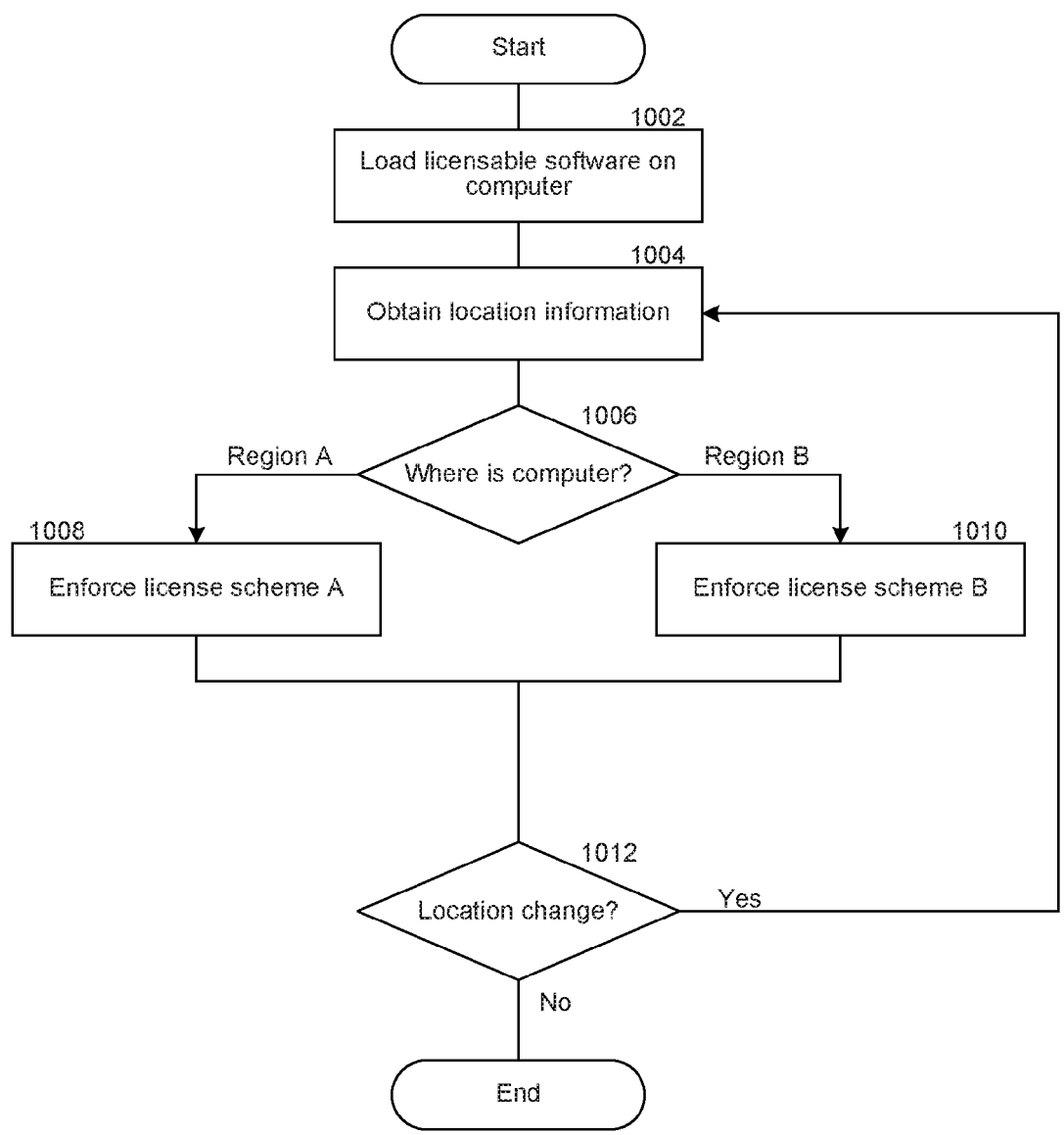
FIG. 10 is a flowchart depicting an embodiment of location based licensure
Figure 11:
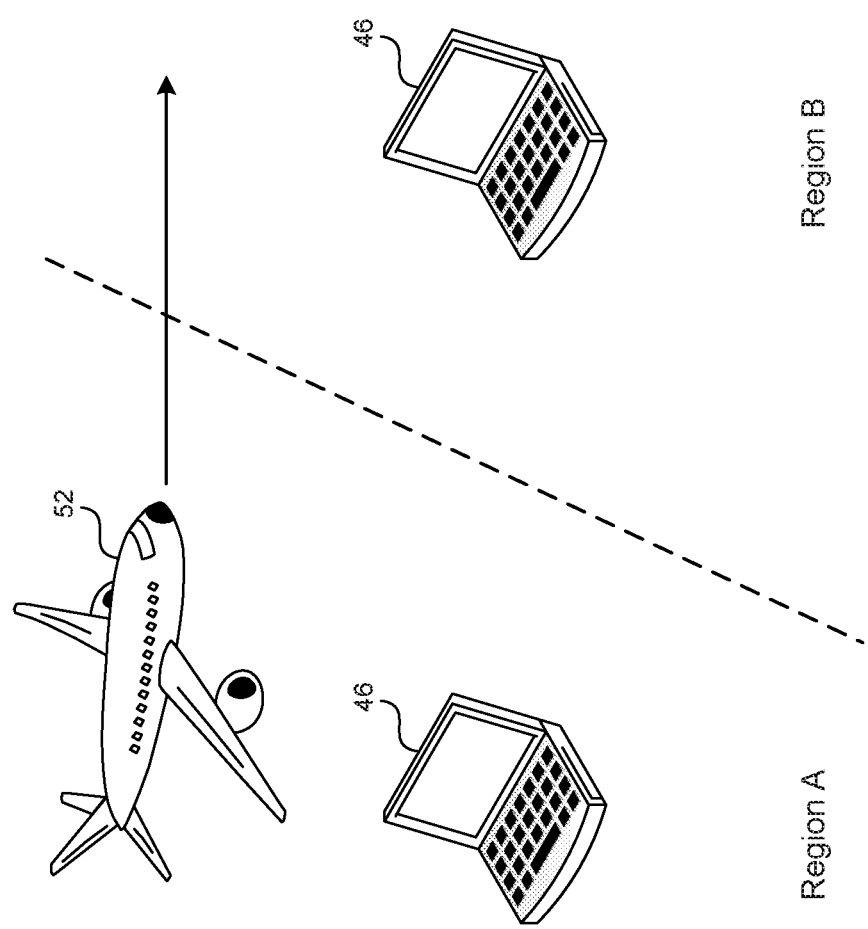
FIG. 11 is an illustration of location based licensure.

FIG. 10 is a flowchart depicting an embodiment of location based licensure, and FIG. 11 is an illustration of location based licensure. To begin, licensable software is loaded onto a location aware computer 46 (1002). Using location sensors 48, 50, the location of the location aware computer 46 is determined (1004). Given options for where the location aware computer is located (1006), differing licensing schemes (1008, 1010) are enforced by the license enforcement module 36. If the location aware computer 46 detects a change in location (1012), the system again obtains location information (1004).

Regions are defined in numerous ways. A first method is to create boundaries referring to a plurality of GPS coordinates. Another method is to give a single set of GPS coordinates and provide an acceptable range from that point. Mapped borders additionally are determined vertically by an altimeter. A third method to define regions is through national, municipal, or otherwise sovereign borders. A fourth method to define a region is with a geo-fence. Alternatively, a region is determined by reference to recognizable features (such as a road, or a building perimeter) or any other suitable method known to define property lines. Defining a region is distinct from determining the location of a location aware computer 46.

For example, while an embodiment of a location aware computer 46 determines location through cell phone tower triangulation, that location has corresponding GPS coordinates, even if a GPS device was not used to determine the location. Cross-referencing the location information with the region boundaries enables the method of invention to perform step 1006.

Numerous examples including regions A and B follow. "Region A" and "Region B" are to remain undefined; though, for illustrative purposes, each region is characterized in multiple inconsistent ways to provide examples. While binary region examples are provided, the invention functions with a plurality of regions beyond the first two.

The license specification 34 contains details concerning how to treat various regions. For example, in one embodiment, certain software 32 is only be licensed while accessed in a certain office (Region A). If a user attempted to operate the software 32 from a location aware computer 46 outside of the office's parking lot (Region B), the software is not licensed, and does not execute. Enforcing the license scheme between inside the office's parking lot (A) and outside of the office's parking lot (B) is carried out by the license enforcement module 36. In use, a user activates the software 32 inside the office parking lot (A) where the license enforcement module 36 enables the software 32. As the user carries the location aware computer 46 out of the office parking lot (B), the software 32 becomes unlicensed and cease to function as previous.

Sometimes, licensure of software is not focused on monetization, but rather, enforcement of regulatory compliance of local laws. In another example, certain encryption functions are licensed in a first country (A), but unlicensed in a second country (B) in order to comply with local laws. In this example, a user in a vehicle activates the encryption feature. As the vehicle crosses the border between first (A) and second (B) country the location aware computer 46 encounters a geo-fence or determine using a location sensor 48 that a national border is being been crossed. The encryption feature is then unlicensed and terminates operation.

Figure 12:
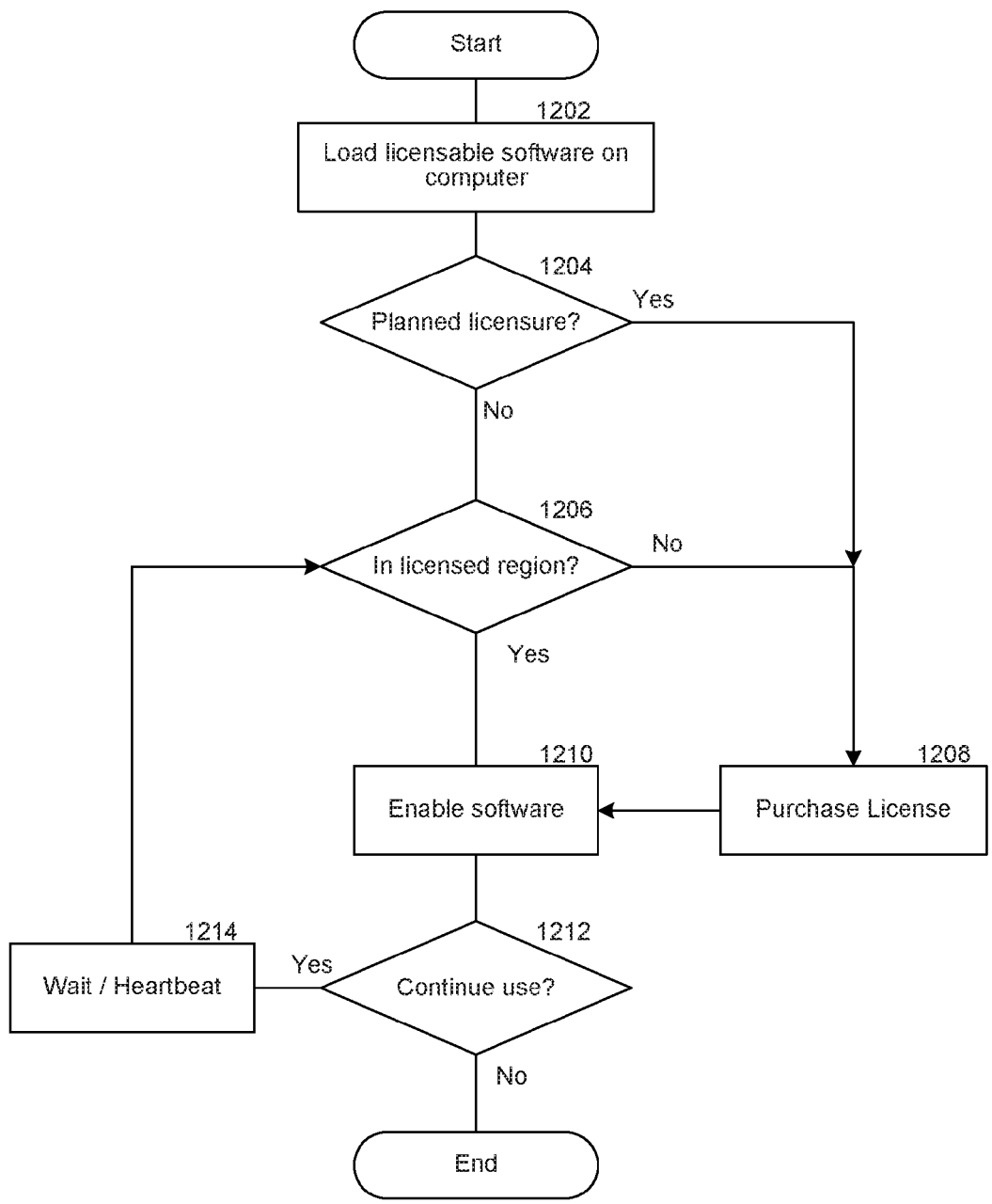
FIG. 12 is a flowchart of a method to purchase location based licenses.

Referring now to FIG. 12 a flowchart of a method to purchase location based licenses, with continued reference to FIG. 11, in an embodiment of the invention, licenses additionally exist only in a given country. Given a location aware computer 46 with licensable software 32 (1202), a user intends to leave a licensed region, and plans ahead of time to obtain a license for the region the user was headed to (1204). When the user attempts to use the software 32, a location check occurs (1206). Had the user opted to obtain a license for a new region previously, or attempted to operate the software 32 in a region wherein the user did not have a license, the user is prompted to purchase a license (1208). Licensing schemes include both permanent and temporary licenses.

Licensed software becomes enabled by the license enforcement module 36 (1210). With continued use of the software 32 (1210), a heartbeat location check or event monitor continuously directs the license enforcement module 36 to check the location of the location aware computer 46 (1214).

As an illustrative example, in travelling between a first country (A) and a second country (B), software 32 existing on the location aware computer 46 is only licensed for the first country (A). It is common for software licenses between two countries to have differing prices. Accordingly, a software author may not want a cheaper license to be effective where licenses are more expensive.

Upon leaving the first country (A) the license enforcement module 36 terminates software operation. However, upon entering another country wherein licenses are purchasable, such as the second country (B), the license enforcement module 36 prompts a user of the location aware computer 46 that the user is invited to purchase an additional or temporary license for the second country (B). Or, in another embodiment of the invention, if there is a price difference between the countries, the license enforcement module 36 requires that the user pay the difference. Upon purchasing a license for the second country, which is recorded in the license specification 34, the software 32 is licensed in the second country (B) and operates as normal.

In another illustrative example, a fisherman who is licensed to fish in a given region of water (A) has an operational license for fish finding software. Should the fisherman move to a second region of water (B), the software may prompt the fisherman to purchase an additional license for the software. In this way, multiple regions within the same national borders offer differing licenses from one region to the next.

Figure 13:
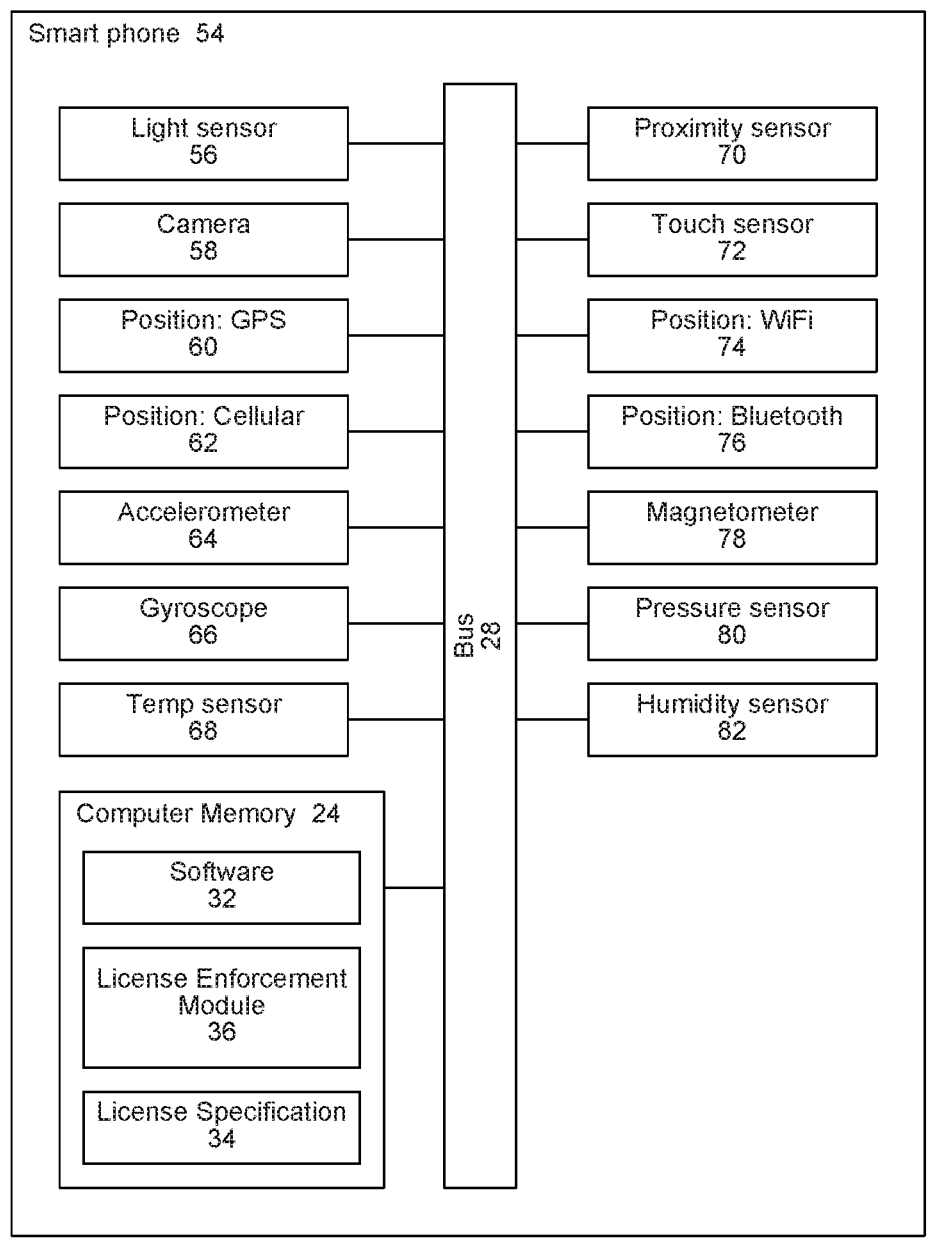
FIG. 13 is a block diagram of a plurality of sensors available to computing devices.

FIG. 13 is a block diagram of a plurality of sensors available to computing devices. An embodiment of a location aware computer 46 is a smartphone 54. Smartphones 54 have a plurality of sensors. Such sensors include a light sensor 56, a camera 58, a GPS 60, a cellular triangulator 62, an accelerometer 64, a gyroscope 66, a thermometer 68, a proximity sensor 70, a touch sensor 72, WiFi locator 74, a Bluetooth locator 76, a magnetometer 78, a pressure sensor 80, and a humidity sensor 82. Many of these sensors are able to provide additional information from which a location or other salient details are determined. These sensors additionally are used to generate licensure factors in a single authentication or MFA scheme.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for operating customer relationship management ("CRM") software to direct execution of installed software on an electronic device based on a multi-factor authentication scheme, comprising:
   at least partially restricting operation of the installed software on the electronic device to a first state of operation;
   expanding operation of the installed software on the electronic device to a second state of operation in response to at least satisfaction of a first condition and a second condition, the second state of operation having more features that the first state of operation, wherein
   the first condition is satisfied by a determination that the electronic device is presently located within a first predefined spatial region; and
   the second condition is satisfied by:
   receiving an identification number by the CRM software from a token, the token having a wireless communicative connection to the electronic device;
   delivering the identification number by the CRM software to an external server; and
   receiving verification of authenticity of the identification number by the CRM software from the external server;
   evaluating whether the first condition and the second condition are met on a periodic interval; and
   restoring restrictions to operation of the installed software to the first state of operation in response to an evaluation that either the first condition and/or the second condition are no longer satisfied.

2. The method of claim 1, further comprising:
   detecting that said electronic device is outside of the first predefined special region; and
   prompting, by the CRM software, a user of the electronic device to activate a second predefined location that is interchangeable with the first predefined spatial region with respect to satisfaction of the first condition.

3. The method of claim 2, wherein said second predefined spatial region includes a present location for the electronic device.

4. The method of claim 1, further comprising:
   receiving an indication through a GUI interface that a user of the electronic device has an intent to travel to a second predefined spatial region; and
   prompting, by the CRM software, the user of the electronic device to activate a second predefined location that is interchangeable with the first predefined spatial region with respect to satisfaction of the first condition.

5. The method of claim 2, further comprising:
   activating, by the CRM software, the second predefined spatial region such that the second predefined spatial region is interchangeable with the first predefined spatial region with respect to satisfaction of the first condition.

6. The method of claim 5, wherein said activating is temporary, whereby after a temporary period, location within the second predefined spatial region no longer satisfies the first condition.

7. The method of claim 1, further comprising
   detecting, but the CRM software, satisfaction of a third condition, the third condition is satisfied by a determination that the electronic device is presently located within a second predefined spatial region; and
   expanding operation of the installed software on the electronic device to a third state of operation in response to at least satisfaction of the second condition and the third condition, the third state of operation having more features that the first state of operation.

8. The method of claim 7, wherein said third state of operation are consistent with local regulatory restrictions in said second predefined spatial region.

9. The method of claim 1, said expanding additionally requiring satisfaction of a third condition.

10. The method of claim 2, further comprising:
    accepting, from the user, payment comprising the difference in a first license fee of the first predefined spatial location and a second license fee of the second predefined spatial region.

11. The method of claim 2 further comprising:
    accepting, from a user, payment comprising the a license fee associated with the second predefined spatial region.

12. The method of claim 5 further comprising:
    accepting, from the user, agreement to new terms and conditions as a prerequisite for said activating.

13. The method of claim 12, said new terms and conditions are consistent with local regulatory restrictions in the second predefined spatial region.

14. A method for operating customer relationship management ("CRM") software to direct execution of installed software on an electronic device based on an authentication scheme, comprising:
    at least partially restricting operation of the installed software on the electronic device to a first state of operation;
    expanding operation of the installed software on the electronic device to a second state of operation in response to at least a first condition is satisfied, the second state of operation having more features that the first state of operation, wherein the first condition is satisfied by:

receiving an identification number by the CRM software from a token, the token in a wireless, bi-directional communicative connection to the electronic device;

receiving verification of authenticity of the identification number by the CRM software from the external server;

evaluating whether the first condition and the first condition is met on a periodic interval; and restoring restrictions to operation of the installed software to the first state of operation in response to an evaluation that the first condition is no longer satisfied.

15. The method of claim 14, wherein said receiving verification of authenticity of the identification number by the CRM software from the external server may only be received by a single instance of the CRM software on the electronic device at a time with respect to the identification number, whereby other instances of the CRM software on other electronic devices may not receive said verification from the external server simultaneously, when using the identification number.

16. The method of claim 14, further comprising detecting, but the CRM software, satisfaction of a second condition; and expanding operation of the installed software on the electronic device to a third state of operation in response to at least satisfaction of the first condition and the second condition, the third state of operation having more features that the first state of operation.

17. The method of claim 14, said identification number comprising a device ID unique to said token.

* * * * *